UNITED STATES PATENT OFFICE.

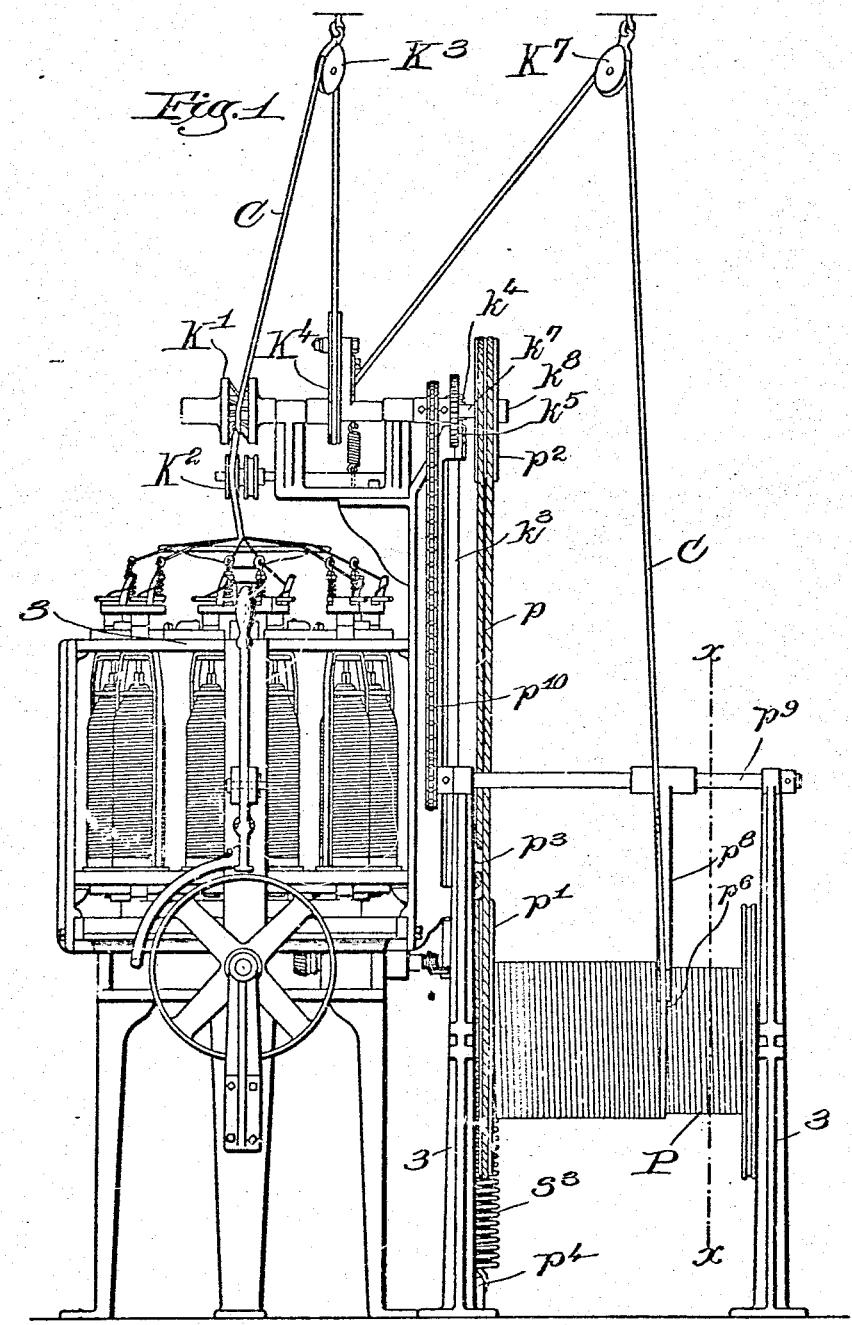

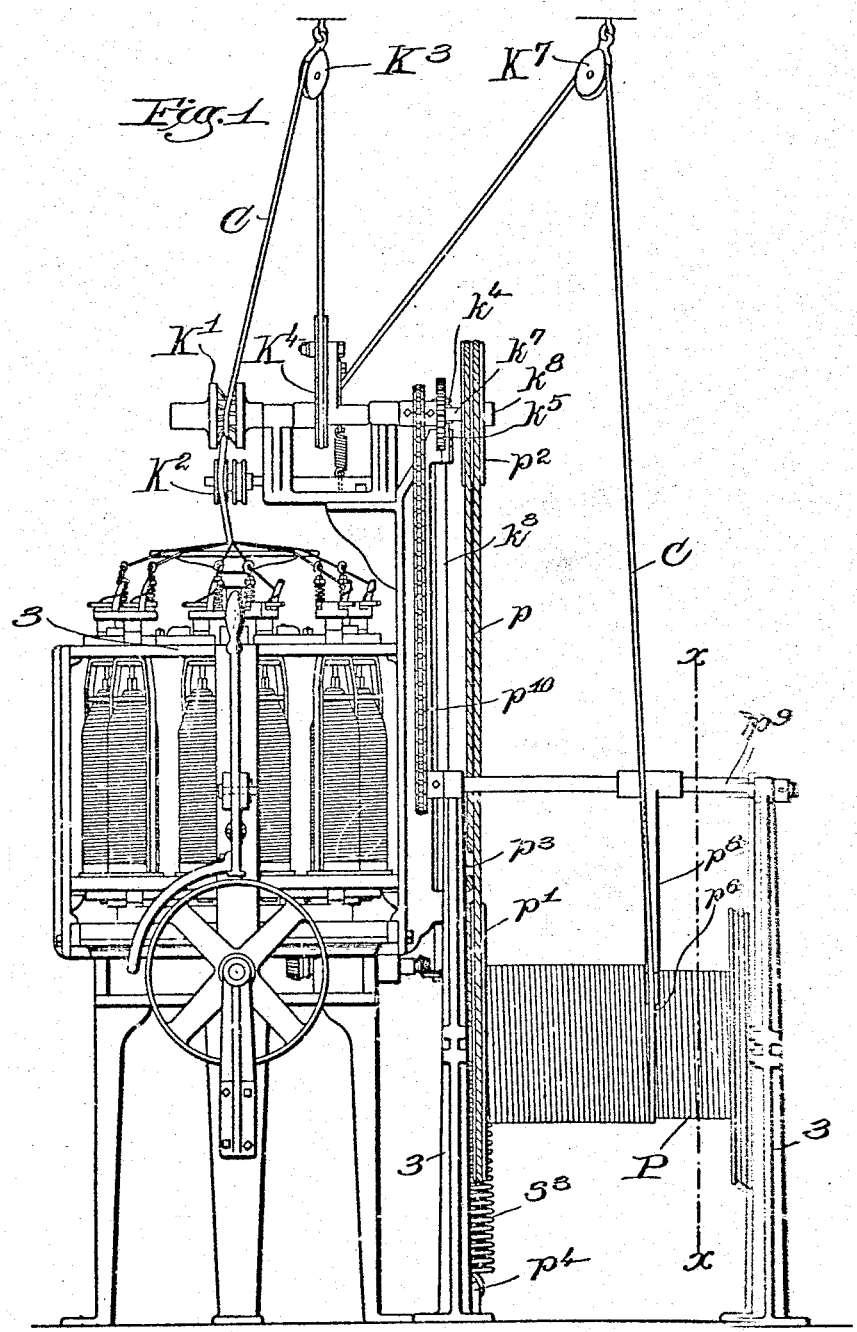

PAUL BUTLER, OF LOWELL, MASSACHUSETTS.

WINDING MECHANISM.

998,231.

Specification of Letters Patent.   Patented July 18, 1911.

Original application filed November 26, 1897, Serial No. 659,888. Divided and this application filed August 28, 1909. Serial No. 514,999.

*To all whom it may concern:*

Be it known that I, PAUL BUTLER, a citizen of the United States, residing at Lowell, county of Middlesex, and State of Massachusetts, have invented an Improvement in Winding Mechanism, of which the following description, in connection with the accompanying drawing, is a specification, like characters on the drawing representing like parts.

This invention has for its object to provide a novel winding mechanism especially adapted for braiding machines, although capable of use in other relations.

The invention illustrated and claimed in this application has been divided out of my co-pending application Se. No. 659,888, filed November 26, 1897, and this application is, therefore, a division of said former application.

In the drawings, Figure 1 is a side view of a braiding machine showing my improved winding mechanism as applied thereto; Fig. 2 is an end view of the winding mechanism: Fig. 3 is a section on the line $x$—$x$, Fig. 1; Fig. 4 is a detail view somewhat enlarged showing the end of the winding finger.

Although I have shown my improved winding mechanism as used in connection with a braiding machine, I do not wish to be limited to such use.

I have shown in the drawings at 3 a braiding machine which may have any suitable or usual character, but which is illustrated as having the same characteristics as that embodied in the braiding machine shown in my above-mentioned co-pending application. This braiding machine is one designed to braid cords, and as the braided cord $c$ is delivered from the braiding machine, it passes to the guide roll $K^2$ and from thence passes to a take-up device $K'$, and thence over a direction pulley $K^3$, and thence to a tension regulator $K^4$, and thence to another direction pulley $K^7$, from whence it passes to the winding mechanism.

The parts above referred to are or may be all as shown in my said co-pending application and form no part of my present invention.

The cord $c$ is wound on a drum or reel P which is supported in suitable stands 3. This reel is frictionally rotated in some suitable way, and as herein illustrated, this is accomplished by an endless cable $p$ which passes around a sheave $p'$ at the end of the reel and thence passes over a double-grooved pulley $p^2$ fast on the shaft $k^8$ of the tension regulator, a spring-actuated pulley block $p^3$ being supported in a loop of the endless cable for the purpose of maintaining an even tension. This pulley block $p^3$ is connected to one end of a spring $s^3$, the other end of which is connected at $p^4$ to some fixed object. The shaft $k^8$ is positively driven from a shaft $k^3$ by means of the worm gear $k^6$ and worm $k^4$, all as shown in said co-pending application. The spring $s^3$ keeps the cord or cable $p$ under sufficient tension to drive the reel by the frictional engagement of the cord with the pulley or sheave $p'$. The braided cord is delivered from the braiding machine at a constant rate of speed and as the size of the reel increases there will be more or less slippage between the cable $p$ and the sheave $p'$.

The cord or rope is wound snugly upon the reel or drum P by or through the action of an arm $p^5$ having at its end a suitable finger $p^6$, preferably elongated in shape and pivotally connected with the said arm at $p^7$, which finger acts against the last-laid coil of the cord $c$. The arm $p^8$ is provided at its end with a groove $p^{10}$ through which the cord passes and which acts to guide the cord. Said arm is shown in Fig. 1 as moving toward the right, but after the completion of the layer then being made and the arrival of the arm $p^8$ at the right hand inner side of the head of the said drum or reel, the arm $p^8$ will be lifted by the coil of yarn being laid and the first coil of a new layer will be laid, and the finger $p^6$ will drop off from it, and, acting on the left hand side of said first coil, will afterward commence to act on the right hand side of said finger $p^6$, and will cause it and the arm $p^8$ to be moved to the left hand end of the drum or reel.

The hub of the arm $p^5$ is mounted loosely on a shaft $p^9$, which is rotated by suitable means, as a sprocket chain $p^{10}$, geared therewith, and deriving its motion from the shaft $k^7$ of the take-up and tension device. This shaft $k^7$ is also driven from the shaft $k^3$ by means of a worm gear $k^5$ fast on the shaft which meshes with the worm gear $k^4$. In my experiments I have found that rotating the shaft $p^9$ is a very important operation because the arm $p^8$ could not be slid practically from one end to the other of a stationary shaft merely by the pressure on the arm of the cord as it is being wound. With the device as herein illustrated, however, this winding arm $p^8$ will move freely and easily backward and forward and the cord will be wound evenly and uniformly on the reel.

The finger $p^6$ is pivoted in order that it may accommodate itself to the increasing size of the reel as the cord builds up. It will be noted that the finger moves ahead of the cord being laid. In other words, that the last turn of the cord presses against the side of the finger and thus pushes the arm forward. The force necessary to push the arm is sufficient to hold the last turn of the cord tightly against the preceding turn, and the position of the groove $p^{70}$ is such that the cord is laid closely against the preceding turn as the drum is wound. When the finger reaches the end of the reel, the cord being wound crowds it up and then said finger automatically drops down over the cord as the first turn is made for the return coil and thereafter the arm $p^8$ will be moved in a reverse direction until the end of the reel is reached.

A winding mechanism as above described has especial advantage when used in connection with a braiding machine, but it is also capable of being used in connection with other machines.

Having fully described my invention, what I claim as new and desire to secure by Letters Patent is:—

1. In a winding mechanism, the combination with a drum or reel, of means to rotate it, a smooth shaft, an arm loosely mounted thereon, a winding finger carried by and movable on said arm and adapted to rest on the reel at one side of the cord as it is winding, and means to rotate said shaft.

2. In a winding mechanism, the combination with a drum or reel, of means to rotate it, a smooth shaft, an arm loosely mounted thereon, a winding finger pivoted to the arm and adapted to rest loosely on the reel at one side of the cord as it is winding, and means to rotate said shaft.

3. In a winding mechanism, the combination with a drum or reel, of means to rotate it, an arm free to be slid parallel to the axis of said drum and provided with a winding finger to act on the side of the cord adjacent the point where it is being delivered on said drum, the laying of the cord in successive coils acting on said finger to cause it and its arm to travel in the direction of the length of the drum, said finger yielding to the last coil of the wound layer and assuming a position in front of the first coil of the next layer.

4. In a winding mechanism, the combination with a drum or reel having a sheaf connected therewith, of a cable passing over said sheaf and having frictional engagement with the sheaf for rotating the drum, a spring for maintaining the cable under a uniform tension, a smooth shaft, an arm loosely mounted thereon, a winding finger carried by and movable on said arm and adapted to rest on the reel at one side of the cord as it is winding, and means to rotate said shaft.

In testimony whereof, I have signed my name to this specification, in the presence of two subscribing witnesses.

PAUL BUTLER.

Witnesses:
  JAS. S. RUSSELL,
  ALBERT W. DAVID.